United States Patent [19]
Adachi et al.

[11] Patent Number: 5,950,785
[45] Date of Patent: Sep. 14, 1999

[54] HUB CLUTCH ASSEMBLY

[75] Inventors: Kenro Adachi, Asaba-cho; Takayuki Norimatsu, Hamamatsu, both of Japan

[73] Assignee: NTN Corporation, Osaka, Japan

[21] Appl. No.: 09/017,664

[22] Filed: Feb. 3, 1998

[30]       Foreign Application Priority Data

Feb. 5, 1997   [JP]   Japan .................................. 9-022784

[51] Int. Cl.⁶ ................................................. F16D 11/04
[52] U.S. Cl. ......................................... 192/69.41; 192/86
[58] Field of Search ............................ 192/69.41; 196/86

[56]             References Cited

U.S. PATENT DOCUMENTS 4,020,933   5/1977   Gill ............................................. 192/86
  4,625,846  12/1986   Gomez ................................. 192/69.41
  4,817,752   4/1989   Lobo et al. ........................... 192/69.41
  5,413,201   5/1995   Vidal ..................................... 192/69.41
  5,788,038   8/1998   Hickey et al. ............................. 192/86

*Primary Examiner*—Charles A. Marmor
*Assistant Examiner*—Tisha D. Waddell
*Attorney, Agent, or Firm*—Wenderoth, Lind & Ponack, L.L.P.

[57]            ABSTRACT

A hub clutch assembly mounted between an axle and a hub of a four-wheel drive vehicle and having a 2WD/4WD position indicator that is simple in structure. A slide ring is axially slidably mounted on the axle. The slide ring is biased by a spring to a position in which an external gear formed on the slide ring engages an internal gear of an outer ring to maintain 4WD position. A magnet fixed to a cover attracts the slide ring to a 2WD position and keeps it in the 2WD position. The drive mode is changed between the 2WD mode and the 4WD mode by supplying pressure fluid only for a limited time period set by timers. A pressure gauge is provided in a passage for pressure fluid to indicate whether the current drive mode is the 2WD mode or the 4WD mode.

7 Claims, 7 Drawing Sheets

HUB CLUTCH ASSEMBLY

BACKGROUND OF THE INVENTION

This invention relates to a hub clutch assembly for selectively transmitting driving force between a wheel axle and a wheel hub, and more particularly a hub clutch assembly having a four-wheel drive mode indicator means that is simple in structure.

A part-time four-wheel drive vehicle has hub clutches mounted between the front wheel hubs and the front axle to selectively transmit torque between the wheels and the axle.

A conventional such hub clutch has an axially slidable slide gear mounted on the axle. By engaging this gear with the wheel hub, the axle is rigidly coupled to the wheel hub (4WD mode). By disengaging the slide gear, the axle is disconnected from the wheel hub (2WD mode). Fluid pressure such as air pressure is used to move the slide gear between the 2WD and 4WD positions.

Such a hub clutch assembly has to have an indicator means which can notify the driver behind the wheel whether the drive mode is now in the 2WD or 4WD position.

Such a drive mode or position indicator is disclosed in unexamined Japanese patent publication 1-186434 and comprises sensors for detecting the 2WD and 4WD positions of the slide gear moved by pressure fluid, and an indicator means electrically connected to the sensors for indicating whether the current drive mode is in the 2WD or 4WD position.

Such sensors are extremely complicated in structure and expensive to manufacture.

An object of this invention is to provide a hub clutch assembly having a 2WD/4WD position indicator means that is simple in structure and includes a pressure detector for detecting a negative pressure used to change the drive mode.

SUMMARY OF THE INVENTION

According to this invention, there is provided a hub clutch assembly comprising a driving member coupled to an axle, a driven member coupled to a wheel hub, the driving member and the driven member being rotatably mounted one around the other, a control means for selectively coupling and disengaging the driving and driven members by supplying pressure fluid, and a pressure gauge provided in a passage of the pressure fluid used to selectively couple and disengage the driving and driven members for detecting whether the driving and driven members are coupled together or disengaged from each other.

According to the invention there is also provided a hub clutch assembly wherein the pressure fluid for selectively coupling and disengaging the driving and driven members is supplied through two passages connected to two respective airtight chambers provided between the driving and driven members, wherein timer-activated valves are provided to selectively supply the pressure fluid into the two passages or discharge pressure fluid from the two passages, and wherein a pressure gauge is provided in at least one of the two passages.

Pressure fluid is supplied only while the driving mode is being changed between 4WD and 2WD positions for a limited time period set by timers. Once the driving mode changes, pressure fluid is released to bring the pressure in the airtight chambers back to the atmospheric pressure. 4WD position is maintained by the elastic force of a spring whereas 2WD position is maintained by attracting the slide ring to the magnet fixed to the cover. The pressure gauge measures the pressure during the drive mode change phase. When it detects a pressure necessary for drive mode change, it indicates that the drive mode has changed from 4WD to 2WD or from 2WD to 4WD.

Other features and objects of the present invention will become apparent from the following description made with reference to the accompanying drawings, in which:

DETAILED DESCRIPTION OF THE PREFERRED EMBODIMENT

An embodiment of this invention is described with reference to the drawings.

Figure 1:
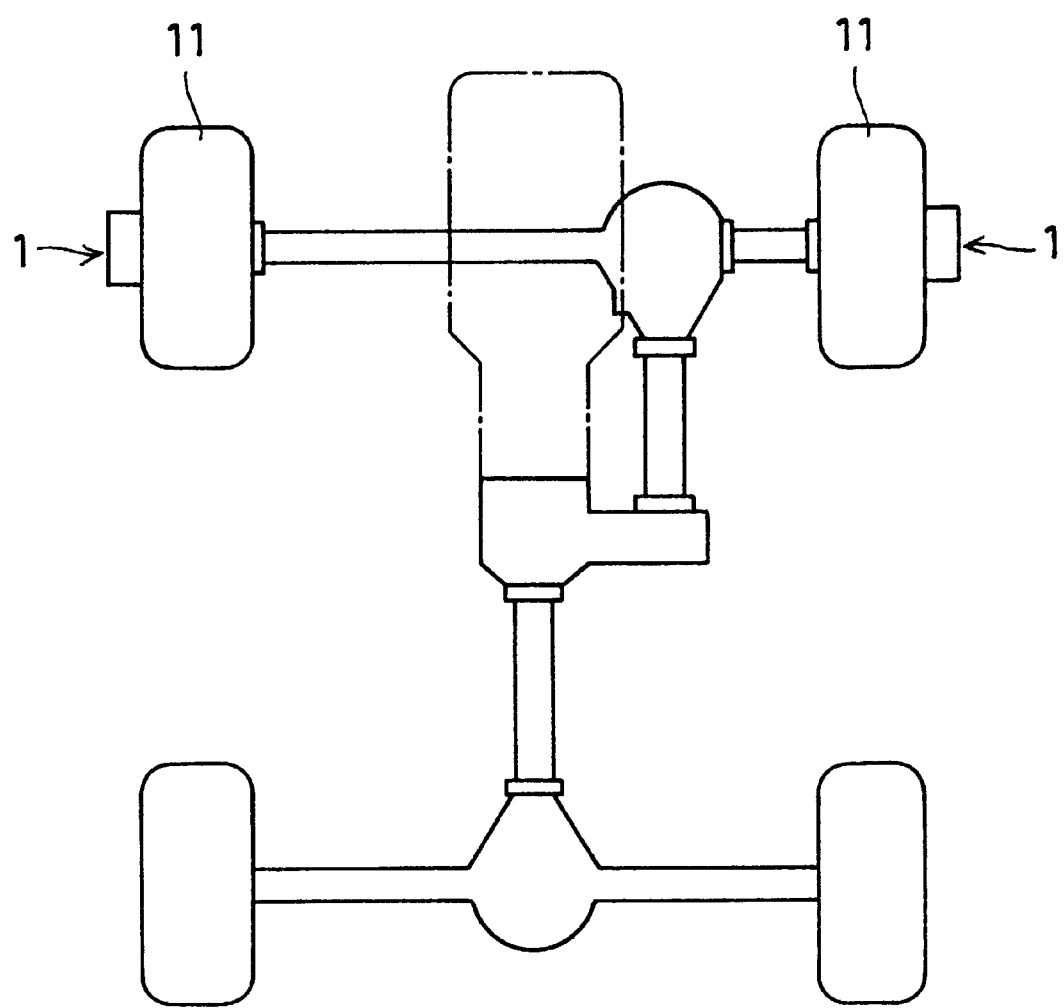
FIG. 1 is a plan view of layout of a 4WD vehicle having hub clutches.

FIG. 1 shows the power train of an FR-based 4WD on which are mounted hub clutches 1 between the front wheels and both ends of the front wheel axle.

Figure 2:
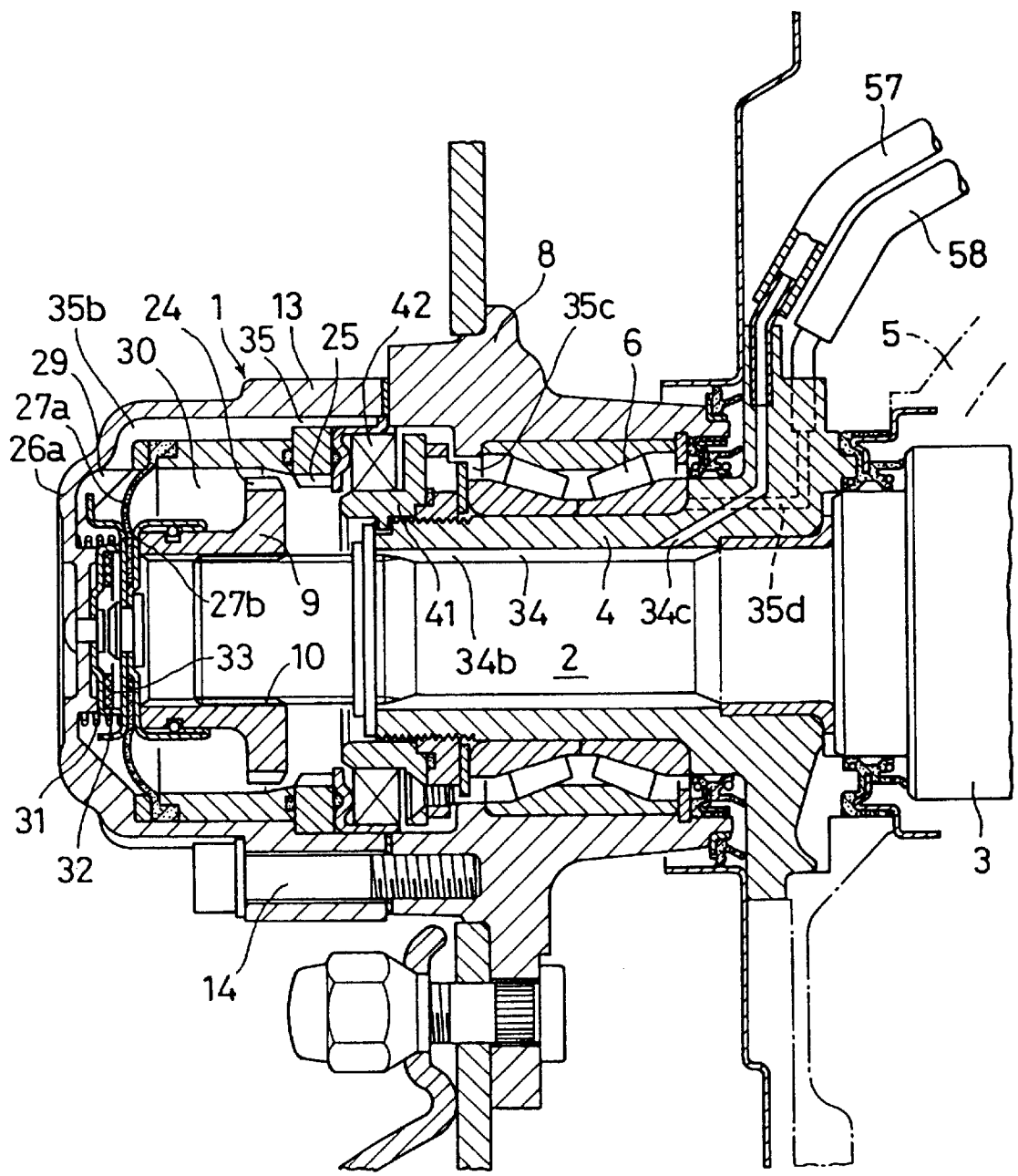
FIG. 2 is a vertical sectional view of a hub clutch assembly mounted on a 4WD vehicle in the 2WD position.
Figure 3:
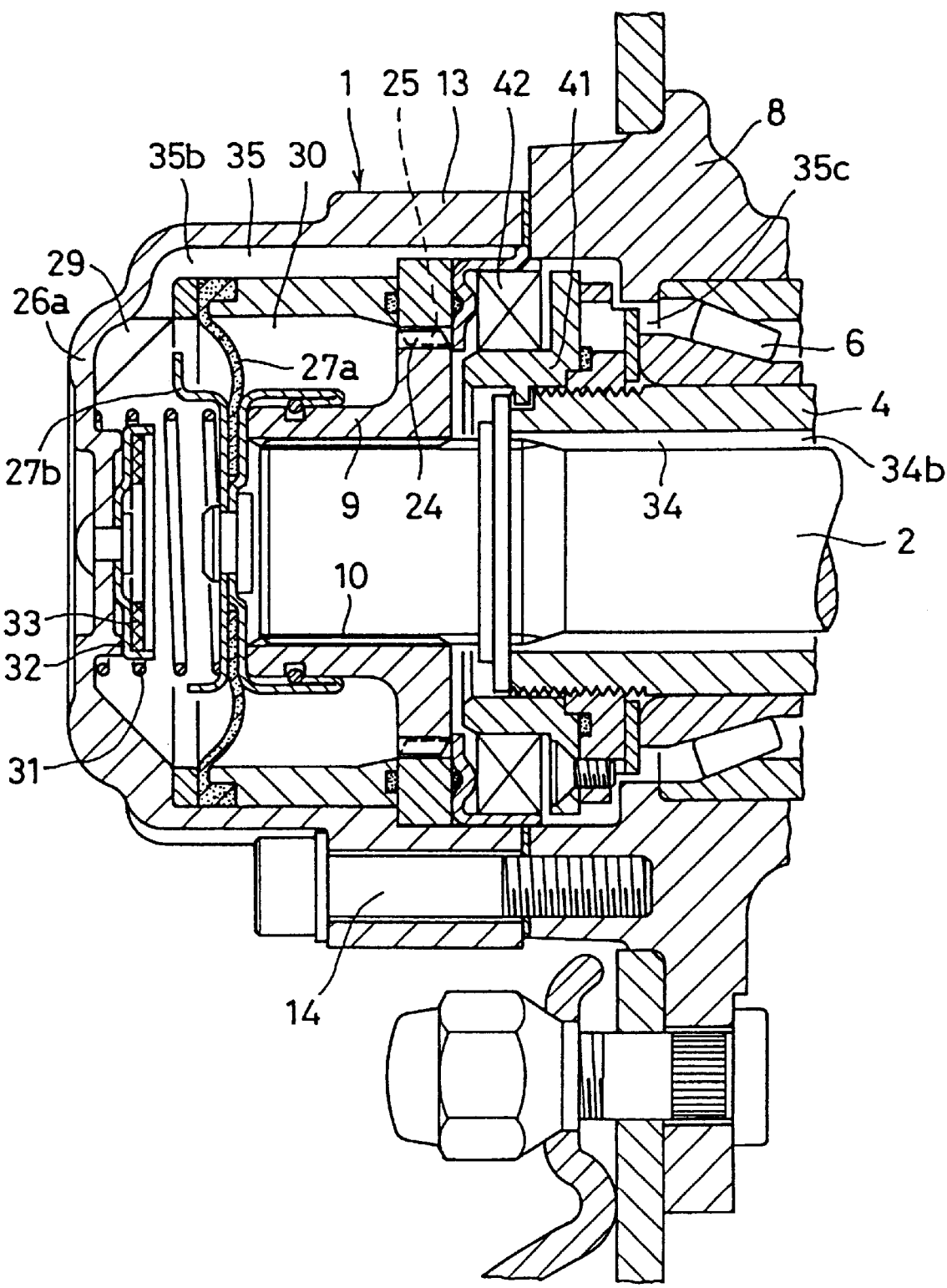
FIG. 3 is an enlarged vertical section of the hub clutch assembly of FIG. 2 in the 4WD position.

FIGS. 2 and 3 show one embodiment of hub clutch 1. The front axle 2 is actually a shaft of a constant velocity joint 3 coupled to the vehicle power train. Mounted on the axle 2 is a spindle 4 fixed to a vehicle knuckle 5 and rotatably supporting a wheel hub 8 through a bearing 6.

The hub clutch 1 has a slide ring 9 as a driving member nonrotatably but axially slidably mounted on the end of the axle 2 through serrations 10. The slide ring 9 carries on its outer periphery an external gear 24. An outer ring 13 as a driven member is rotatably mounted around the slide ring 9. The outer ring 13 has its rear end fixed to an end face of the wheel hub 8 by bolts 14. The outer ring 13 has on its inner periphery an internal gear 25 adapted to mesh with the external gear 24.

The outer ring 13 has its outer end closed by a cover 26a integral with the ring 13. A diaphragm 27a has its outer edge airtightly fixed to the inner periphery of the outer ring 13 and its radially inner portion joined to the slide ring 9 so as to be axially movable together with the ring 9 while maintaining airtightness therebetween. The diaphragm 27a thus partitions the interior of the outer ring 13 into two airtight chambers 29 and 30.

A spring 31 is mounted between the opposed faces of the diaphragm 27a and the cover 26a in a compressed state, thus biasing the slide ring 9 rearwardly toward its back position. A magnet 33 is fixed to the inner face of the cover 26a at its center through a case 32. When the slide ring 9 is in its front position in which the external gear 24 is not in mesh with the internal gear 25, the magnet 33 attracts a metal fixing piece 27b of the diaphragm 27a, thus keeping the ring 9 in its front position.

In order to change the driving mode between a two-wheel and a four-wheel drive position, air passages 34 and 35 communicate with the airtight chambers 30 and 29, respectively.

The first air passage 35 comprises a passage 35b formed in the outer ring 13 and communicating with the outer airtight chamber 29, a gap 35c between the spindle 4 and the wheel hub 8, and a passage 35d formed in the rear end of the spindle 4 so as to communicate with the gap 35c and the gap in the bearing 6 mounted in the gap 35c. The passage 35d is connected to an air pipe 58 connected to an air source, which will be described later.

The second air passage 34 communicating with the inner airtight chamber 30 comprises a gap 34b between the front wheel axle 2 and the spindle 4, and a passage 34c formed in the spindle 4 near its rear end so as to communicate with the gap 34b. The passage 34c is connected to an air pipe 57 connected to the air source.

The airtight chambers 29 and 30 are kept airtight by an oil seal 42 mounted between a nut 41 threaded onto the tip of the spindle 4 and the inner periphery of the outer ring 13. Since the first passage 35 is mostly the gap between the spindle 4 and the wheel hub 3, and the second passage 34 is mostly the gap between the front wheel axle 2 and the spindle 4, the formation of such passages barely increases the diameter of the hub clutch 1.

Now in operation, in order to change the drive mode to the 4WD position, the slide ring 9 is moved inwardly to bring the external gear 24 into mesh with the internal gear 25.

In this state, the front axle 2 and the outer ring 13 are directly coupled together, so that all four wheels are now coupled to the engine. This means that the engine brake is distributed to all the wheels.

To change the drive mode from 4WD to 2WD, air drawn out of the outer airtight chamber 29. The negative pressure thus created in the chamber 29 acts on the diaphragm 27a, so that the slide ring 9 is pulled outwardly against the force of the spring 31 until the external gear 24 disengages from the internal gear 25 as shown in FIG. 2.

Thus, by selectively creating a negative pressure in either of the airtight chambers 29 and 30, the drive mode can be changed between 2WD and 4WD. The magnet 33 attracts the diaphragm 27a to keep the 2WD position. The spring 31 maintains the 4WD position.

Figure 4:
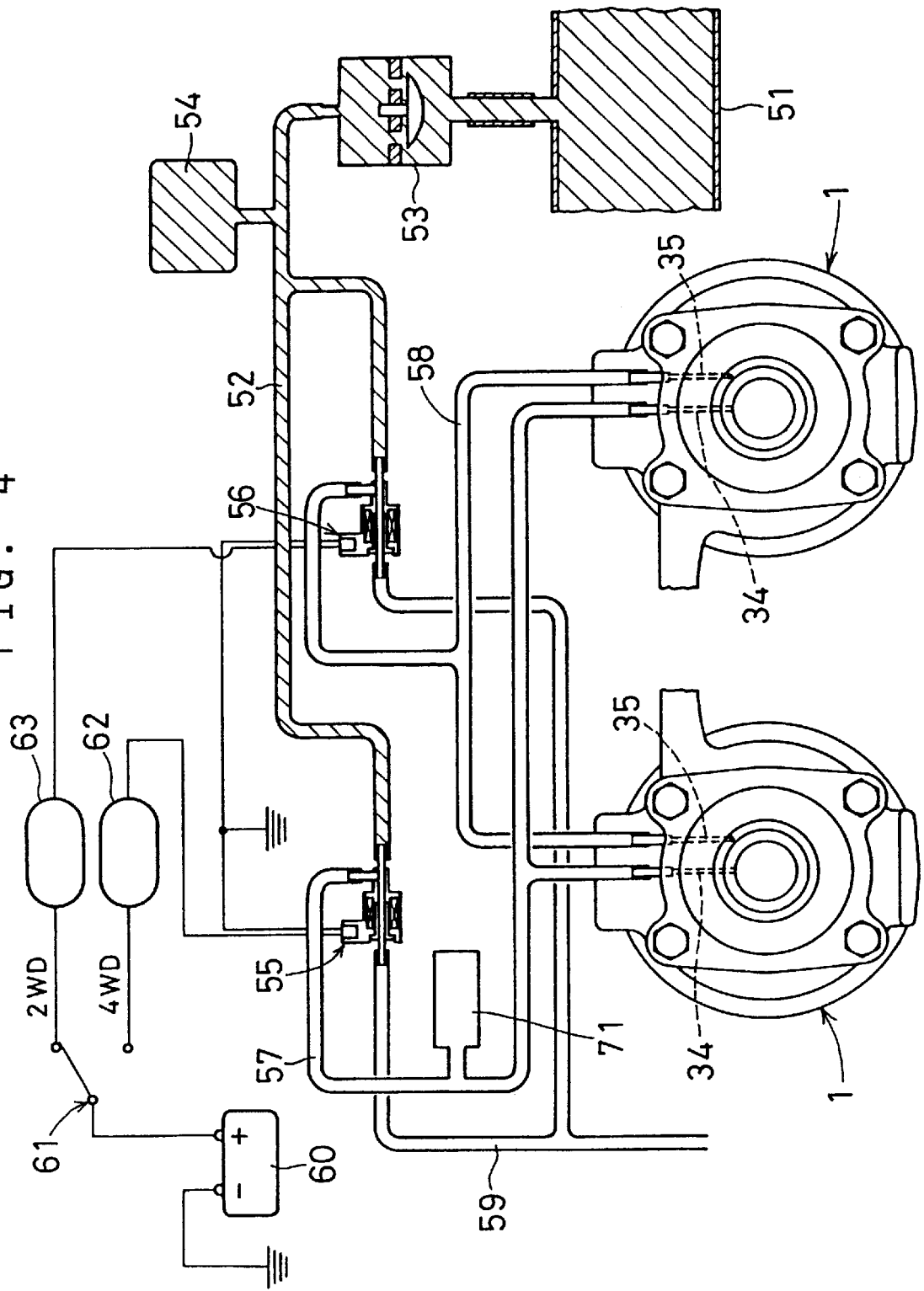
FIG. 4 shows a control device in the 2WD position.

FIG. 4 shows a control device connected to the first and second air passages 34, 35 for controlling the position change of the slide ring 9 between 2WD and 4WD.

The control device includes a negative pressure source 51 which may be the engine intake manifold, a pump or a compressor. Connected to the negative pressure source 51 is a negative pressure pipe 52 provided with a check valve 53 and a negative pressure tank 54 and having bifurcated lines connected to first and second electromagnetic valves 55 and 56, respectively.

If the negative pressure source 51 is the intake manifold, the manifold cannot create a negative pressure while the engine is being accelerated. In this case, a negative pressure is supplied by the negative pressure tank 54.

The first electromagnetic valve 55 is used to change the drive mode from 2WD to 4WD. The first pipe 57 has its one end connected to one port of the electromagnetic valve 55 and the other end thereof connected to the second air passage 34 of each hub clutch 1 at its passage 34c formed in the spindle 4 near its rear end.

The second electromagnetic valve 56 is used to change the drive mode from 4WD to 2WD. The second pipe 58 has one end thereof connected to one port of the valve 56 and the other end thereof to the first air passage 35 of each hub clutch 1 at its passage 35d formed in the spindle 4 near its rear end.

Each of the electromagnetic valves 55, 56 has an outlet port which communicates with the atmosphere through a pipe 59. When energized, the valve 55 assumes a position in which the negative pressure pipe 52 communicates with the first pipe 57. When deenergized, the valve 55 assumes a position in which the negative pressure pipe 52 is disconnected from the first pipe 57, and the first pipe 57 communicates with the pipe 59.

When the second valve 56 is energized, the negative pressure pipe 52 communicates with the second pipe 58. When it is deenergized, the negative pressure pipe 52 is disconnected from the second pipe 58, and the second pipe 58 communicates with the pipe 59.

The electromagnetic valves 55 and 56 are connected to a power source 60 through a hub lock switch 61. A first timer 62 and a second timer 63 are provided in the lines between the switch 61 and the respective valves 55, 56. When the position of the switch 61 is changed, one of the valves 55, 56 is energized and a negative pressure is applied to the diaphragm 27a for a time period determined by the respective timer 62, 63.

A pressure gauge, or a negative pressure gauge 71 to be exact, is provided in the first pipe 57 connected to the negative pressure pipe 52 through the first electromagnetic valve 55. The gauge 71 indicates whether the current drive mode is the 2WD mode or the 4WD mode.

Figure 7:
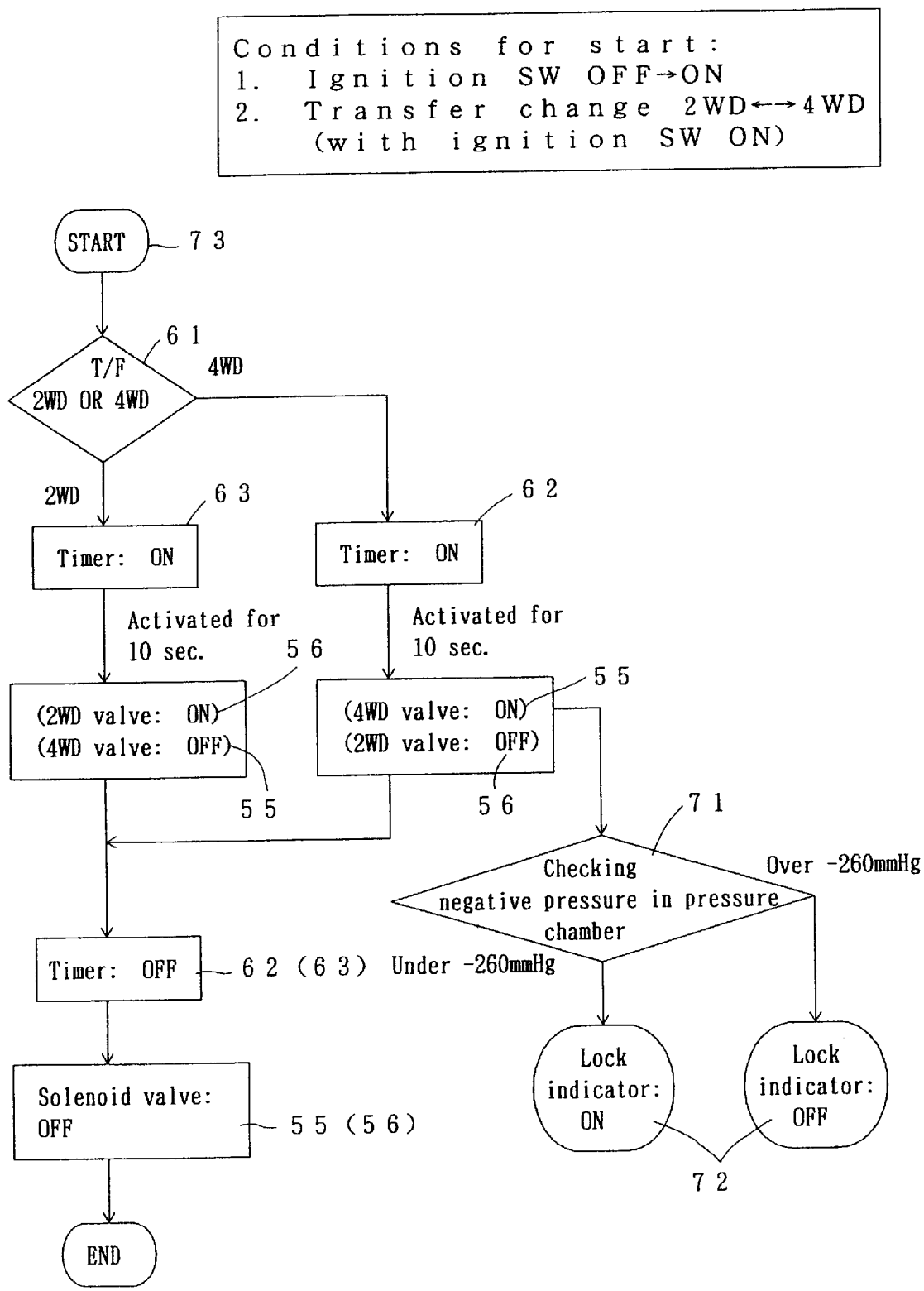
FIG. 7 is a flowchart of the operation of the control device.

FIG. 7 shows the flowchart of the operation of the control device provided with the negative pressure gauge 71, which measures the negative pressure created in the airtight chamber 30 when the drive mode is changed from 2WD to 4WD. If the negative pressure reading on the gauge is smaller than the minimum negative pressure (e.g. −260 mm Hg) necessary to move the slide ring 9 from the 2WD to 4WD position, the gauge 71 turns on the lock indicator 72 to indicate that the drive mode is now the 4WD mode. If it is higher than that, the gauge 71 turns off the lock indicator 72 to indicate that the drive mode is the 2WD mode.

Needless to say, the lock indicator 72 has to be arranged at a position where the driver at the driver seat can see it. Two negative pressure gauges may be provided in the first pipe 57 and the second pipe 58, respectively.

Now in operation, during 2WD mode shown in FIG. 2, the metal piece 27b of the diaphragm 27a is attracted to the magnet 33 while compressing the spring 31. Thus, the slide ring 9 is at the outer position, with the external gear 24 disengaged from the internal gear 25.

In this state, the front wheel axle (driving ember) is disconnected from the wheel hub (driven ember) and, no torque is transmitted from the wheel hub to the axle.

Since the front axle 2 is disconnected from the engine by the transfer in this state, no driving force is transmitted to the front axle 2 either from the engine or the wheels. Thus, the drive train from the transfer to the front axle stops during 2WD mode.

FIG. 4 shows the control device during 2WD mode. The first and second electromagnetic valves 55, 56 are both deenergized, so that their spools shut off communication between the negative pressure pipe 52 and the first and second pipes 57, 58. Thus, the first and second air passages 34, 35, as well as the airtight chambers 29, 30, are at the atmospheric pressure.

Figure 5:
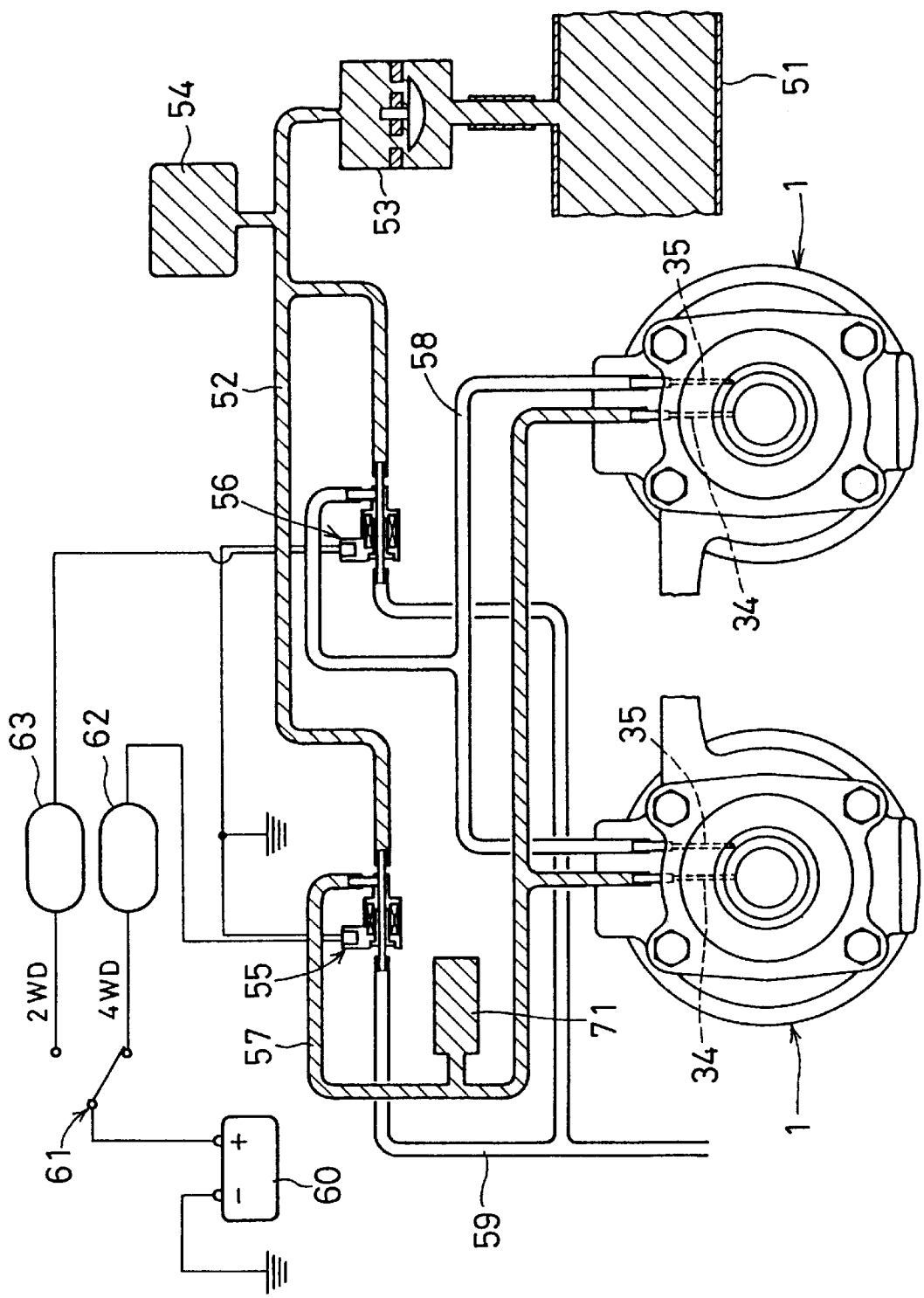
FIG. 5 shows the control device of FIG. 4 when the drive mode is being changed from 2WD to 4WD position.

To change the drive mode from 2WD to 4WD, the transfer is changed from the 2WD position to the 4WD position with the ignition switch 73 on as shown in FIG. 7. This automatically causes the hub lock switch 61 to change from 2WD to 4WD position as shown in FIG. 5, energizing the first electromagnetic valve 55 connected to the switch 61 through the timer 62. The negative pressure pipe 52 is now brought into communication with the first pipe 57, so that the negative pressure produced in the negative pressure source 51 is applied to the inner airtight chamber 30 through the first pipe 57 and the second air passage 34. The negative pressure in the first pipe 57 is thus detected by the negative pressure gauge 71.

When the air in the airtight chamber 30 is drawn out under a negative pressure lower than a predetermined level through the second air passage 34, a negative pressure acts on the diaphragm 27a, pulling the slide ring 9 inwardly away from the cover 26 in cooperation with the force of the spring 31 against the attracting force of the magnet 33 until the external gear 24 engages the internal gear 25 of the outer ring 13. The drive mode now shifts to 4WD position. During the 4WD mode, engine brake can be applied to both front and rear wheels.

By applying a negative pressure lower than the predetermined level, it is possible to change the drive mode with high reliability. The negative pressure gauge 71 turns on the lock indicator 72 to notify the driver that the drive mode is now the 4WD mode.

When a predetermined time determined by the timer 62 has passed, the first electromagnetic valve 55 is deenergized, so that the communication between the negative pressure pipe 52 and the first pipe 57 is shut off, and the first pipe 57 is brought into communication with the pipe 59. The pressure in the airtight chamber 30 thus rises to the atmospheric pressure.

Figure 6:
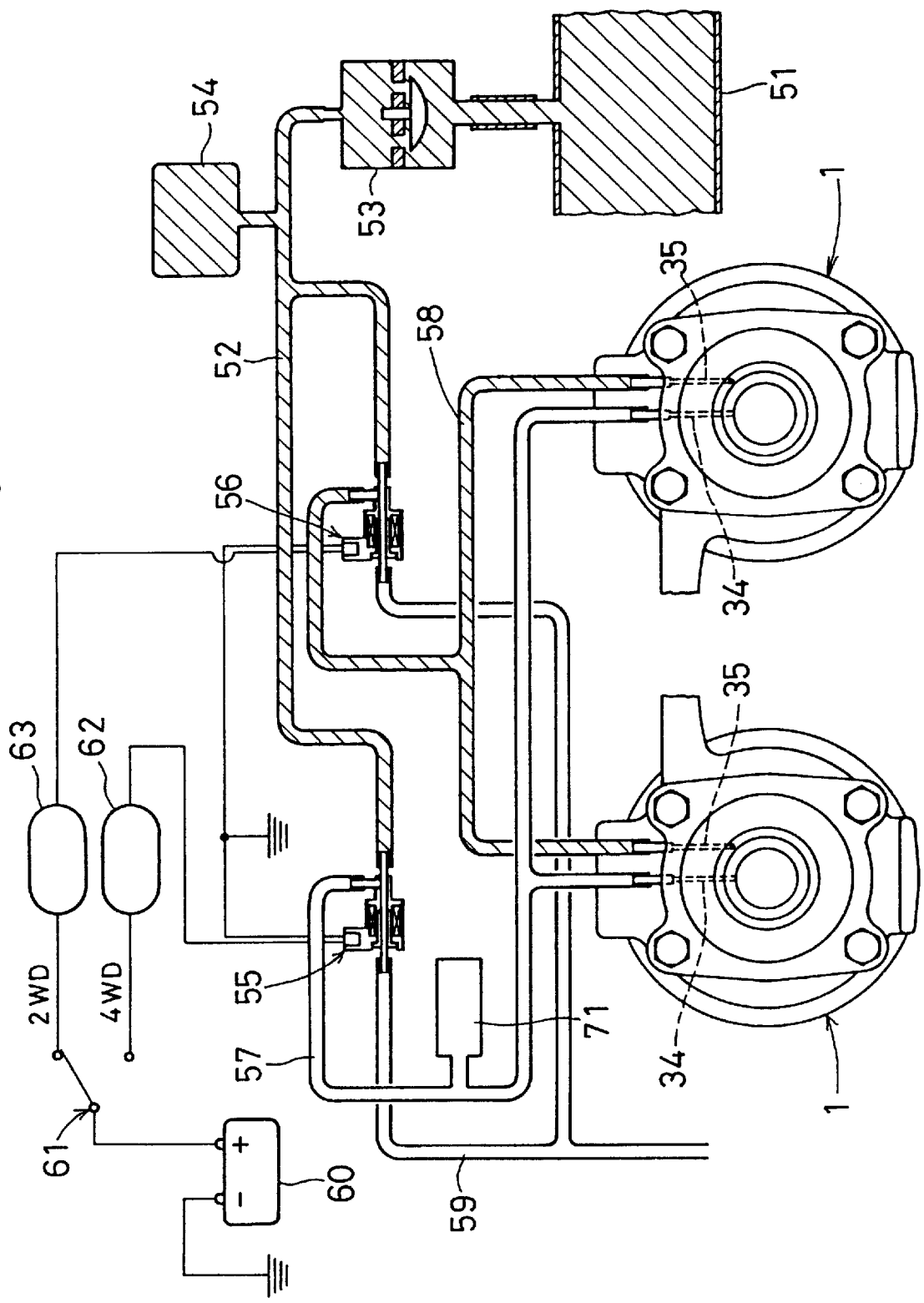
FIG. 6 shows the control device of FIG. 4 when the drive mode is being changed from 4WD to 2WD position.

To change over the drive mode from 4WD to 2WD mode, the transfer mode is shifted from 4WD to 2WD mode. This automatically shifts the hub lock switch 61 from 4WD to 2WD position as shown in FIG. 6, thus energizing the second electromagnetic valve 56 connected to the switch 61 through the second timer 63. The negative pressure pipe 52 is now brought into communication with the second pipe 58, so that the negative pressure produced in the negative pressure source 51 is applied to the outer airtight chamber 29 through the second pipe 58 and the first air passage 35.

The negative pressure created in the outer airtight chamber 29 pulls the diaphragm 27a and the slide ring 9 outwardly against the force of the spring 31 until the metal piece 27b of the diaphragm 27a is attracted to the magnet 33. The external gear 24 is now disengaged from the internal gear 25.

After a predetermined time, the second timer 63 deenergizes the second electromagnetic valve 56 to shut off communication between the negative pressure pipe 52 and the second pipe 58 and bring the second pipe 58 into communication with the pipe 59. The pressure in the airtight chamber 29 thus rises to the atmospheric pressure. The negative pressure gauge 71 detects the atmospheric pressure, which is higher than the predetermined negative pressure, thus turning off the lock indicator 72 to notify the driver that the drive mode is now in 2WD position.

As described above, the drive mode can be changed by selectively creating a negative pressure in the airtight chambers 29 and 30 partitioned by the diaphragm 27a. The 2WD position is maintained by attracting the metal piece 27b of the diaphragm 27a to the magnet 33. The 4WD position is maintained by the force of the spring 31.

Thus, once the ring 9 is moved to the 2WD or 4WD position, there is no need to keep creating a negative pressure in either of the chambers 29, 30. That is, the pressure in the chambers 29 and 30 can be brought back to the atmospheric pressure. Thus, hub seals, spindle seals and seal rings 28 are subjected to negative pressures only for a short period of time. This extends the life of these members.

The timers 62 and 63, as well as the electromagnetic valves 55 and 56, are never activated simultaneously. If the hub lock switch 61 is changed while one of the valves and the corresponding timer are energized, this valve and the corresponding timer are deenergized and the other valve and the corresponding timer are now energized.

In the illustrated example, the negative pressure gauge 71 is provided in the first pipe 57 to detect change from 2WD to 4WD. But instead, it may be provided in the second pipe 58 to detect change from 4WD to 2WD to indicate the 4WD position.

According to this invention, a negative pressure gauge is provided in an air passage for a negative pressure fluid for changing the drive mode between the 2WD mode and the 4WD mode to indicate the 4WD position. Thus, no separate 4WD position indicator means as used in conventional such assemblies is necessary. The hub clutch assembly according to this invention is thus simple in structure and less expensive.

What is claimed is:

1. A hub clutch assembly comprising:
    a driving member to be coupled to an axle;
    an outer ring coupled to a wheel hub and rotatably mounted around said driving member so as to be selectively driven by said driving member, said outer ring having a closed end, said driving member being axially movable between a first position in which said driving member is in engagement with said outer ring and a second position in which said driving member is not in engagement with said outer ring;
    a movable wall fixed to said driving member and defining first and second variable-volume air-tightly sealed chambers in said outer ring;
    first and second fluid passages for connecting said first and second chambers to external pressure sources, respectively;
    a spring biasing said movable wall and thus said driving member toward one of said first and second positions;
    a permanent magnet for magnetically attracting said movable wall toward said closed end of said outer ring, thereby biasing said driving member toward the other of said first and second positions; and
    a pressure gauge provided in at least one of said first and second fluid passages for measuring pressure in at least one of said first and second fluid passages to determine whether said driving member is in engagement with said outer ring.

2. A hub clutch assembly as claimed in claim 1, further comprising:
    timer-activated valves for respectively opening said first and second fluid passages for a predetermined time period.

3. A hub clutch assembly as claimed in claim 1, further comprising:
    a bearing supporting said wheel hub; and
    wherein one of said first and second fluid passages is formed partially by a space in said bearing.

4. A hub clutch assembly as claimed in claim 1, wherein said permanent magnet is fixed to said closed end of said outer ring.

5. A hub clutch assembly as claimed in claim 4, further comprising:

a bearing supporting said wheel hub; and wherein one of said first and second fluid passages is formed partially by a space in said bearing.

6. A hub clutch assembly as claimed in claim 5, further comprising:

timer-activated valves for respectively opening said first and second fluid passages for a predetermined time period.

7. A hub clutch assembly as claimed in claim 4, further comprising:

timer-activated valves for respectively opening said first and second fluid passages for a predetermined time period.

* * * * *